(12) United States Patent
Khan et al.

(10) Patent No.: US 10,557,098 B1
(45) Date of Patent: Feb. 11, 2020

(54) SYNTHESIS OF HYDROCHAR FROM JACKFRUIT

(71) Applicant: KING SAUD UNIVERSITY, Riyadh (SA)

(72) Inventors: Moonis Ali Khan, Riyadh (SA); Ayoub Abdullah Alqadami, Riyadh (SA); Masoom Raza Siddiqui, Riyadh (SA); Zeid Abdullah Alothman, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/360,397

(22) Filed: Mar. 21, 2019

(51) Int. Cl.
  *C10L 5/44* (2006.01)
  *C01B 32/324* (2017.01)
  *C01B 32/20* (2017.01)

(52) U.S. Cl.
  CPC .............. *C10L 5/447* (2013.01); *C01B 32/20* (2017.08); *C01B 32/324* (2017.08)

(58) Field of Classification Search
  None
  See application file for complete search history.

(56) References Cited

U.S. PATENT DOCUMENTS

| | | | |
|---|---|---|---|
| 9,150,892 B2 | 10/2015 | Pandey et al. | |
| 10,090,117 B1 | 10/2018 | Ramalingam et al. | |
| 2018/0037461 A1 | 2/2018 | Conner et al. | |

FOREIGN PATENT DOCUMENTS

WO  2016/072932 A1  5/2016

OTHER PUBLICATIONS

Ismadji et al.; Activated Carbon from Jackfruit Peel WAste by H3PO4 Chemical Activation Pore Structure and Surface Chemistry Characterization; Chemical Engineering Journal; 140, 32-42; 2008.*
Inbaraj et al., "Carbonised jackfruit peel as an adsorbent for the removal of Cd(II) from aqueous solution,"Bioresource Technology, vol. 94, Issue 1, Aug. 2004, pp. 49-52.
Jayarajan et al., "Agricultural Wastes of Jackfruit Peel Nano-Porous Adsorbent for Removal of Rhodamine Dye," Asian Journal of Applied Sciences, 2011, vol. 4, Issue 3, pp. 263-270.
Foo et al., "A cost effective method for regeneration of durian shell and jackfruit peel activated carbons by microwave irradiation;" Chemical Engineering Journal, vols. 193-194, Jun. 15, 2012, pp. 404-409.
Mallampati et al., "Fruit Peels as Efficient Renewable Adsorbents for Removal of Dissolved Heavy Metals and Dyes from Water," ACS Sustainable Chemistry & Engineering, Apr. 2015.

* cited by examiner

*Primary Examiner* — Guinever S Gregorio
(74) *Attorney, Agent, or Firm* — Richard C. Litman; Nath, Goldberg & Meyer

(57) ABSTRACT

A method of producing hydrochar from jackfruit peel biomass includes hydrothermal carbonization of jackfruit peel biomass by autoclaving at 150° C.-250° C. for about 3 hours to produce a hydrochar. The hydrochar can be activated by treatment with phosphoric acid ($H_3PO_4$), hydrogen peroxide ($H_2O_2$), or a combination thereof. The hydrochar produced according to the method is particularly effective at removing azo-dyes, and specifically methylene blue, from aqueous solutions such as industrial waste water.

6 Claims, 9 Drawing Sheets

SYNTHESIS OF HYDROCHAR FROM JACKFRUIT

BACKGROUND

1. Field

The disclosure of the present patent application relates to hydrochar (HC), and particularly to a jack fruit peel hydrochar (JFHC) for the adsorptive removal of methylene blue (MB), a cationic synthetic dye, from an aqueous environment.

2. Description of the Related Art

Dyes are used as coloring agents and may be classified on the basis of their chromophores. Both synthetic and natural dyes, together including more than 10,000 commercial dyes, are used in various fields, including food science, arts, textiles, and fashion.

Methylene blue (MB) is an azo dye, extensively used for dyeing and printing applications across technological fields. In low concentrations, MB is non-hazardous; however, acute MB exposure can cause cyanosis, jaundice, Heinz body formation, vomiting, and tissue necrosis in humans. Monitoring and limiting MB concentration in wastewater streams before discharging them to water reservoirs is essential in preventing such noxious effects.

Generally, used-dye contaminated wastewater treatment technologies include processes based on advanced oxidation, biodegradation, ion-exchange, and adsorption. Water treatment technologies based on adsorption have advantages of operational simplicity, economic feasibility and high efficiency. Activated carbon (AC) is a conventional adsorbent used for sequestering pollutants from water. However, regeneration and slow desorption kinetics restrict wide range usage of AC. Additionally, AC is commonly derived from non-renewable coal, and is therefore in finite supply.

Char produced from an abundantly available solid waste biomass—for example, from plants, animals and humans—is an alternate material for incorporating into an adsorption-based waste management approach. Char, whether biochar (BC) or hydrochar (HC), produced from otherwise useless solid waste biomass, is a carbonaceous product having a wide range of energy and environmental applications. HC is typically generated by hydrothermal carbonization (HTC) of wet/dry waste biomass in a low temperature range of 150° C.-350° C. Relative to BC, HC has high oxygen functional groups content, but lower porosity and surface area.

Jackfruit (JF), *Artocarpus heterophyllus*, is widely grown in tropical climates. Usually, a mature JF weighs 10 kg-25 kg. A fibrous rind and unfertilized floral parts, comprising around 50% of the JF mass, contribute no economic or nutritional value and are usually discarded as waste. The jack fruit peel (JFP) thereby presents a significant source of wasted biomass.

Accordingly, a method of synthesizing hydrochar from jackfruit solving the aforementioned problems is desired.

SUMMARY

A method of synthesizing jackfruit hydrochar (JFHC) from jackfruit peel includes subjecting jackfruit peel to hydrothermal carbonization (HTC) to provide a JFHC. The step of HTC may be performed at a temperature ranging from about 150° C. to about 250° C. for a set reaction time of about 30 min to about 24 hours. The JFHC can be chemically activated. Activation of the JFHC may include treatment with phosphoric acid ($H_3PO_4$, PA) and/or hydrogen peroxide ($H_2O_2$, HP). JFHC produced according to the presently disclosed methods effectively adsorbs MB from an aqueous environment.

These and other features of the present teachings will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
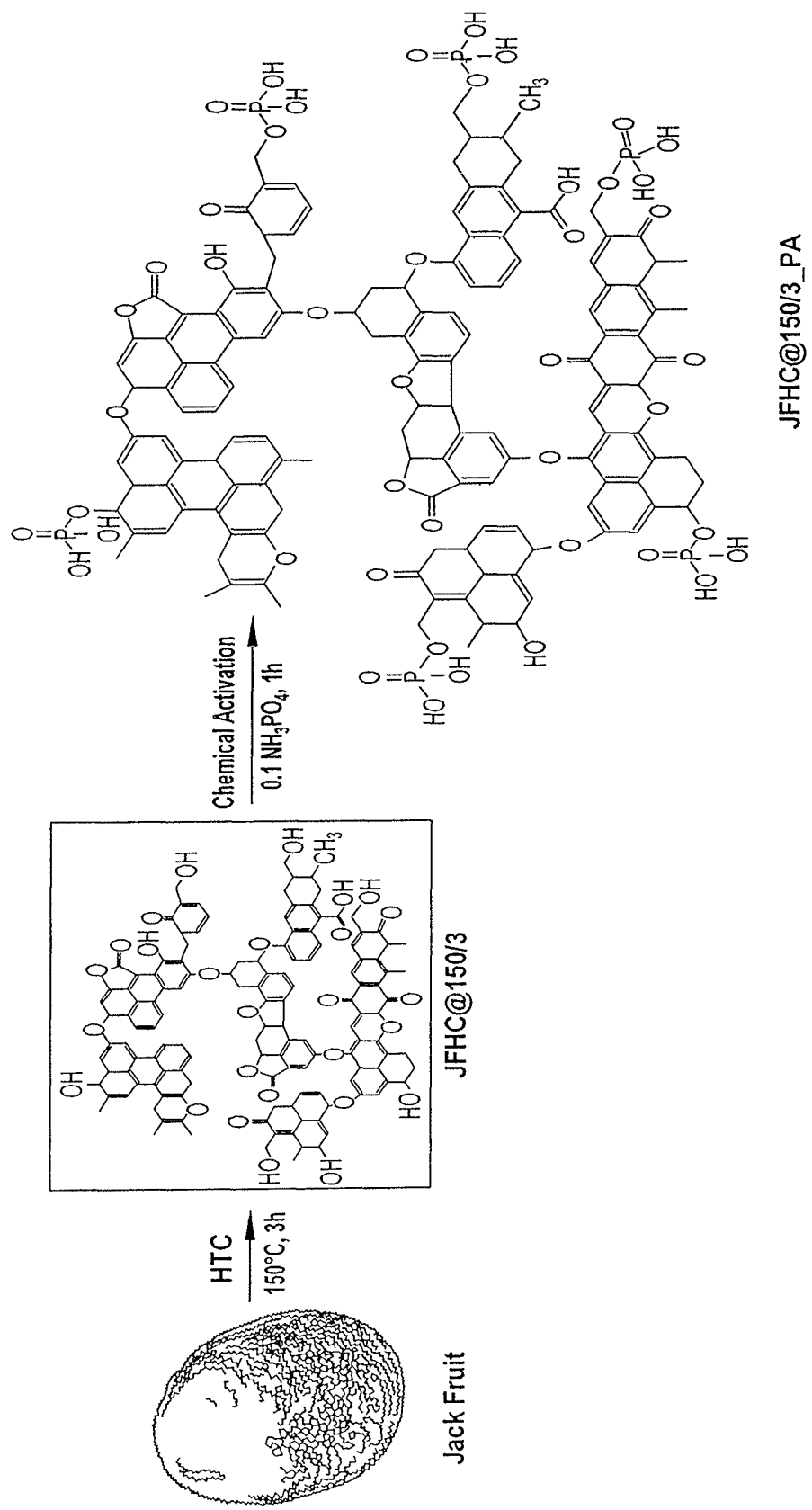
FIG. 1 is a reaction scheme for the development and chemical activation of JFHC@150/3.

A method of synthesizing jackfruit hydrochar (JFHC) from jackfruit peel includes subjecting jackfruit peel to hydrothermal carbonization (HTC) to provide an initial JFHC. Preferably the jackfruit peel is dried and pulverized before being subjected to HTC. The method of synthesizing JFHC may further include an activation step to optimize the initial JFHC as an effective adsorbent for cations, such as methylene blue (MB), from aqueous environments.

The step of HTC may be performed at a temperature ranging from about 150° C. to about 300° C., e.g., 150° C. to about 250° C. for a set reaction time. The reaction time can range from about 30 min to about 24 hours. According to an embodiment, the HTC is performed at a temperature of about 150° C. for about 3 hours. Activation of the initial JFHC may include treatment with an activating compound, such as phosphoric acid ($H_3PO_4$, PA), hydrogen peroxide ($H_2O_2$, HP), or both. Exemplary chemical conditions for activating the initial JFHC can include treatment with 0.1 N phosphoric acid ($H_3PO_4$, PA) or, alternatively, 10% hydrogen peroxide ($H_2O_2$, HP). The chemically activated JFHC sample can then be separated using any suitable method, e.g., filtration or centrifugation. For example, filtration can be conducted using Whatman filter paper 41. JFHC produced according to the presently disclosed methods effectively adsorbs MB from an aqueous environment.

A method of removing MB from an aqueous environment can include contacting the activated JFHC with the aqueous environment.

As used herein, the term "about" when modifying a numerical value shall mean within 10% of the modified numerical value.

As described herein, an exemplary JFHC sample exhibiting maximal MB removal efficiency was prepared by subjecting jackfruit peel biomass to hydrothermal carbonization at 150° C. for 3 h to provide JFHC, and chemical activation of JFHC with 0.1N PA to provide an activated JFHC, referred to hereinafter as "JFHC@150/3_PA". Fourier-transform infrared spectroscopy (FT-IR) analysis confirmed that phosphate ($PO_4^{3-}$) groups were covalently attached with hydroxyl (—OH) groups during chemical activation of the JFHC@150/3_PA. The adherence of $PO_4^{3-}$ group with JFHC@150/3_PA during chemical activation was further confirmed by X-ray photoelectron spectroscopy (XPS), which revealed the presence of a spectral peak at 133.7 eV, characteristic of P2p. After MB adsorption on JFHC@150/3_PA, as described herein, spectral peaks observed at 401 and 163 eV, attributed to N1 s and S2p, confirmed successful adsorption of MB on JFHC@150/3_PA. Morphologically, a surface of pristine JFHC@150/3_PA appeared uneven and porous prior to MB adsorption. Following MB adsorption, the surface of JFHC@150/3_PA appeared less porous, presumably due to occupation of pores with MB molecules. A total of 78% weight loss of the JFHC@150/3_PA sample for a temperature ranging from 30° C.–750° C. was observed during thermogravimetric analysis (see FIG. 6).

Maximum MB adsorption (214.7 mg/g) on JFHC@150/3_PA was observed for an initial pH ($pH_i$) of 7.24. The MB adsorption capacity decreased and % adsorption increased with an increase in JFHC@150/3_PA dose. The contact time study at varied MB concentration $C_o$ from 25 mg/L-100 mg/L revealed an increase in adsorption capacity from 80.8 mg/g to 261.6 mg/g, while the equilibration time varied between 240 min (4 h) to 360 min (6 h). The adsorption of MB for $C_o$ in the range: 15 mg/L-150 mg/L decreased with increase in temperature for the temperature range 20° C.-50° C.

During the desorption study described in the following examples, acids (HCl, HCOOH, $CH_3COOH$) of 0.1 M concentration, base (NaOH) of 0.1 M concentration and solvents ($CH_3OH$, $C_2H_5OH$, $CH_3COCH_3$) were used to elute MB from JFHC@150/3_PA samples. A maximum (40.4%) MB elution was observed with 0.1 M HCOOH, and increased to 52.6%, with 10-folds (1.0 M) increase in HCOOH concentration.

Example 1

Synthesis of Jackfruit Peel Hydrochar (JFHC)

Waste JFP was collected from a local vegetable market in Saudi Arabia, chopped with a knife into small pieces (~1 cm cube), and dried at 60° C. for a week in an oven. The dried JFP was washed with deionized (D.I.) water to completely remove any impurities, such as dirt and dust. The dried and rinsed JFP was again dried overnight at 60° C. and the dried JFP was manually crushed using a mortar and pestle. The uniformly crushed JFP biomass was subjected to HTC in a 200 mL polytetrafluoroethylene (PTFE) lined autoclave. In a typical HTC procedure, a slurry of JFP biomass was first made by adding 75 mL D.I. water to 8 g JFP biomass, and then transferred to an HTC reactor. The reactor was sealed and heated at 150° C. for 3 h in an oven and was then cooled at room temperature. The sample (JFHC@150/3) was collected through filtration and washed several times with D.I. water to remove unwanted products generated during the HTC process. FIG. 1 schematically shows the method of synthesizing JFHC@150/3. Analogous embodiments of the present method were used to synthesize JFHC samples at 200° C. (JFHC@200/3) and 250° C. (JFHC@250/3).

Example 2

Chemical Activation of Developed JFHC Samples

The developed JFHC samples (JFHC@150/3, JFHC@200/3 and JFHC@250/3) were chemically activated with phosphoric acid (0.1 N $H_3PO_4$; PA), hydrogen peroxide (10% $H_2O_2$; HP), and a phosphoric acid+hydrogen peroxide (0.1N $H_3PO_4$+10% $H_2O_2$: PA+HP) mixture. One gram of JFHC@150/3 was treated separately with either 50 mL PA (JFHC@150/3_PA), 50 mL HP (JFHC@150/3_HP), or 50 mL PA+HP (JFHC@150/3_PA HP) with stirring by a magnetic stirrer at 200 rpm for an hour. The resulting chemically activated samples were separated, e.g., through filtration, and washed several times with D.I. water until a neutral pH of the JFHC rinse water was achieved. All three samples were dried overnight at 80° C. in an oven. The same activation protocols for chemical activation were performed on the JFHC@200/3 and JFHC@250/3 samples. The nomenclature of the resulting synthesized JFHC samples is given in Table 1. FIG. 1 illustrates the JFHC@150/3 activation with PA through covalent bond formation.

TABLE 1

Hydrothermal carbonization and chemical activation conditions, nomenclature, and MB adsorption on JFHC samples S4 sample selected for detailed MB adsorption studies.

| | HTC Conditions | | | | MB |
|---|---|---|---|---|---|
| S. No. | Temp (° C.) | Time (h) | Chemical Treatment | Nomenclature | adsorption (%) |
| S1 | 150 | 3 | Untreated | JFHC@150/3 | 93.3 |
| S2 | 200 | 3 | Untreated | JFHC@200/3 | 92.4 |
| S3 | 250 | 3 | Untreated | JFHC@250/3 | 92.4 |
| S4 | 150 | 3 | 0.1N $H_3PO_4$ | JFHC@150/3_PA | 99.5 |
| S5 | 200 | 3 | 0.1N $H_3PO_4$ | JFHC@200/3_PA | 98.5 |
| S6 | 250 | 3 | 0.1N $H_3PO_4$ | JFHC@250/3_PA | 98.6 |
| S7 | 150 | 3 | 10% $H_2O_2$ | JFHC@150/3_HP | 99.0 |
| S8 | 200 | 3 | 10% $H_2O_2$ | JFHC@200/3_HP | 98.6 |
| S9 | 250 | 3 | 10% $H_2O_2$ | JFHC@250/3_HP | 98.8 |
| S10 | 150 | 3 | 0.1N $H_3PO_4$ + 10% $H_2O_2$ | JFHC@ 150/3_PA_HP | 99.1 |
| S11 | 200 | 3 | 0.1N $H_3PO_4$ + 10% $H_2O_2$ | JFHC@ 200/3_PA_HP | 98.8 |
| S12 | 250 | 3 | 0.1N $H_3PO_4$ + 10% $H_2O_2$ | JFHC@ 250/3_PA_HP | 99.1 |

Example 3

Figure 2:
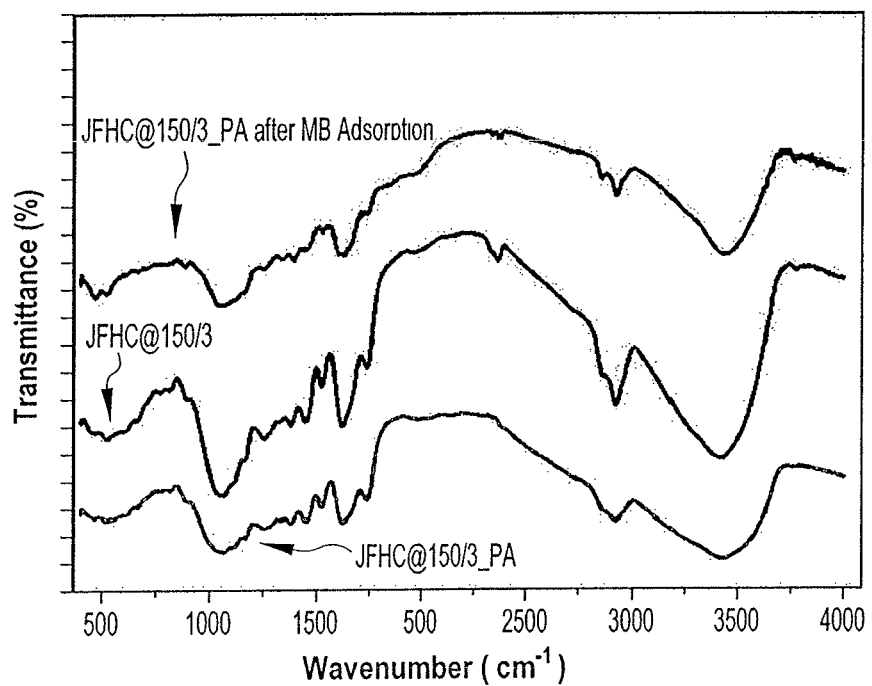
FIG. 2 is a plot showing the Fourier transform infra-red (FT-IR) spectra of JFHC@150/3, JFHC@150/3_PA, and MB saturated JFHC@150/3_PA.

Characterization of Developed and Chemically Activated JFHC Samples, and Presumed MB Adsorption Mechanism The functional groups present on the pristine JFHC@150/3 and JFHC@150/3_PA samples and involved during MB adsorption on JFHC@150/3_PA were detected by FT-IR (Nicolet 6700, Thermo Scientific, USA) spectroscopic analysis, as illustrated in FIG. 2. A band at 3443 cm$^{-1}$ was attributed to hydroxyl (—OH) group stretching vibrations (Wang et al., 2017). Two adjacent bands at 2827 cm$^{-1}$ and 2928 cm$^{-1}$ were attributed to symmetric and asymmetric vibrations of C—H groups (Wang et al., 2017). A band at 1733 cm$^{-1}$ was attributed to carbonyl (C=O) group stretching vibrations in ester and acetyl linkages in hemicellulose and lignin. Bands at 1622 cm$^{-1}$ and 1519 cm$^{-1}$ were associated with the aromatic ring present in lignin. The bands at 1053 cm$^{1}$ and 1159 cm$^{-1}$ were associated with C—O—C stretching vibrations in cellulose. After chemical activation of JFHC@150/3 with PA, a band in range: 973 cm$^{-1}$-1100 cm$^{-1}$, characteristic of phosphate ($PO_4^{3-}$) group appeared (Roguska et al., 2011). However, this band was overlapped with signal from C—O—C groups, confirmed by a decrease in band size. Additionally, $PO_4^{3-}$ groups were covalently attached with —OH groups present on JFHC@150/3 during chemical activation, confirmed by a decrease in band size due to dehydration. After MB adsorption on JFHC@150/3_PA, the bands at 1059 cm$^{-1}$ and 3443 cm$^{-1}$ were shifted to 1040 cm$^{-1}$ and 3431 cm$^{-1}$ with a decrease in their respective sizes.

Figure 3:
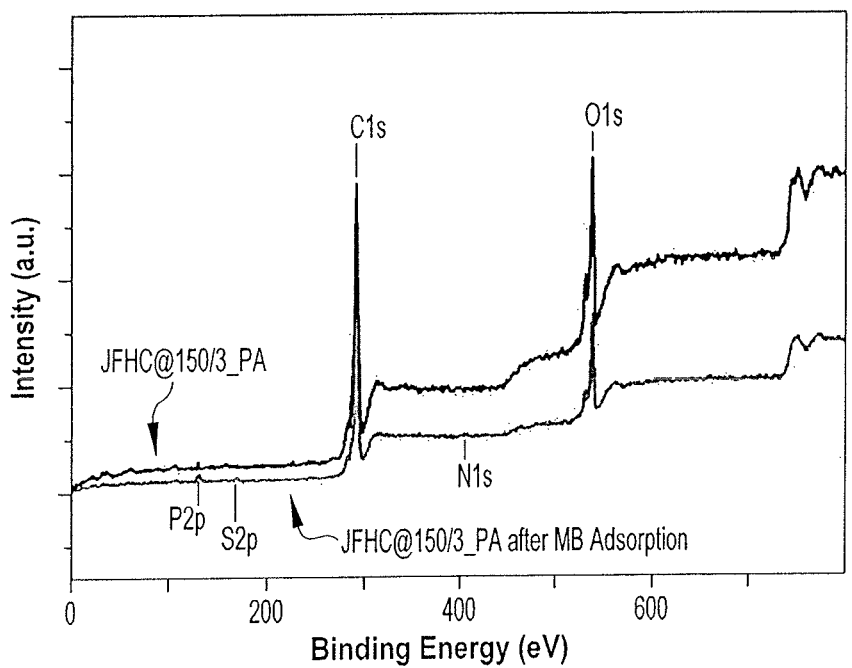
FIG. 3 is a plot showing XPS survey spectra of pristine and MB saturated JFHC@150/3_PA.

The chemical composition of pristine and MB saturated JFHC@150/3_PA were characterized by XPS (Joel JPS-9200, Japan) analysis. FIG. 3 shows the spectrum resulting from pristine JFHC@150/3_PA, with three peaks at 531 eV, 284.6 eV and 133.7 eV, attributable to O1s, C1s, and P2p, respectively. Two new peaks at 401 eV and 163 eV attributed to N1s and S2p appear in the spectrum of MB saturated JFHC@150/3_PA. The appearance of N1s and S2p peaks in the MB saturated JFHC@150/3_PA spectrum is consistent with MB adsorption onto the JFHC@150/3_PA surface.

Figure 4A:
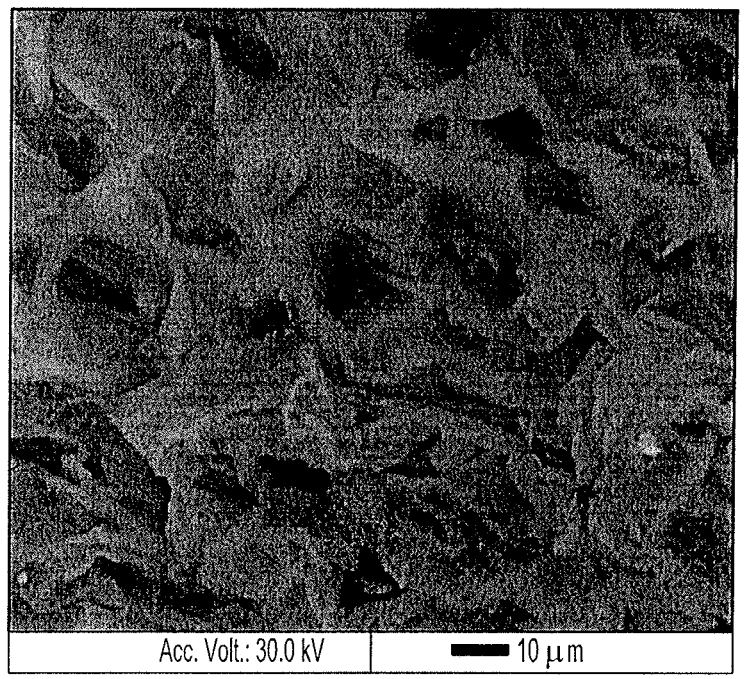
FIGS. 4A-4B shows scanning electron microscopy (SEM) images of pristine (FIG. 4A) and MB saturated JFHC@150/3_PA (FIG. 4B).
Figure 4B:
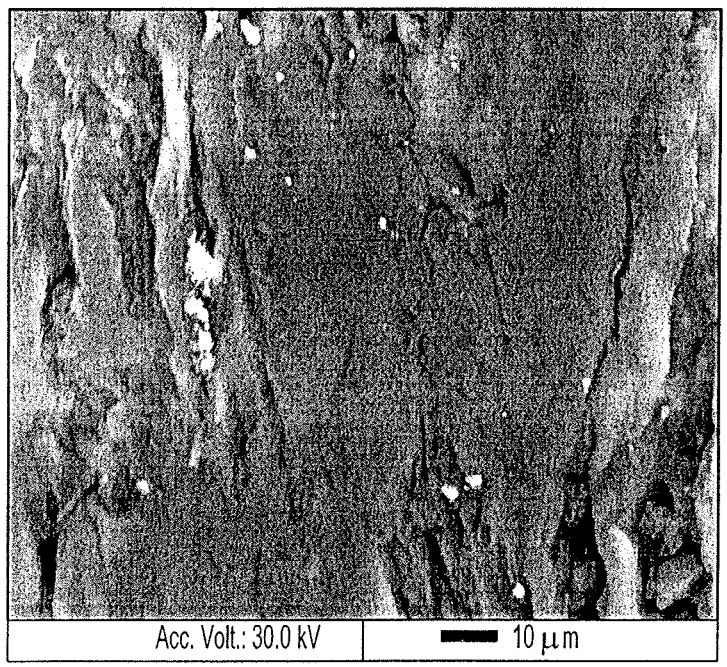
Figure 5A:
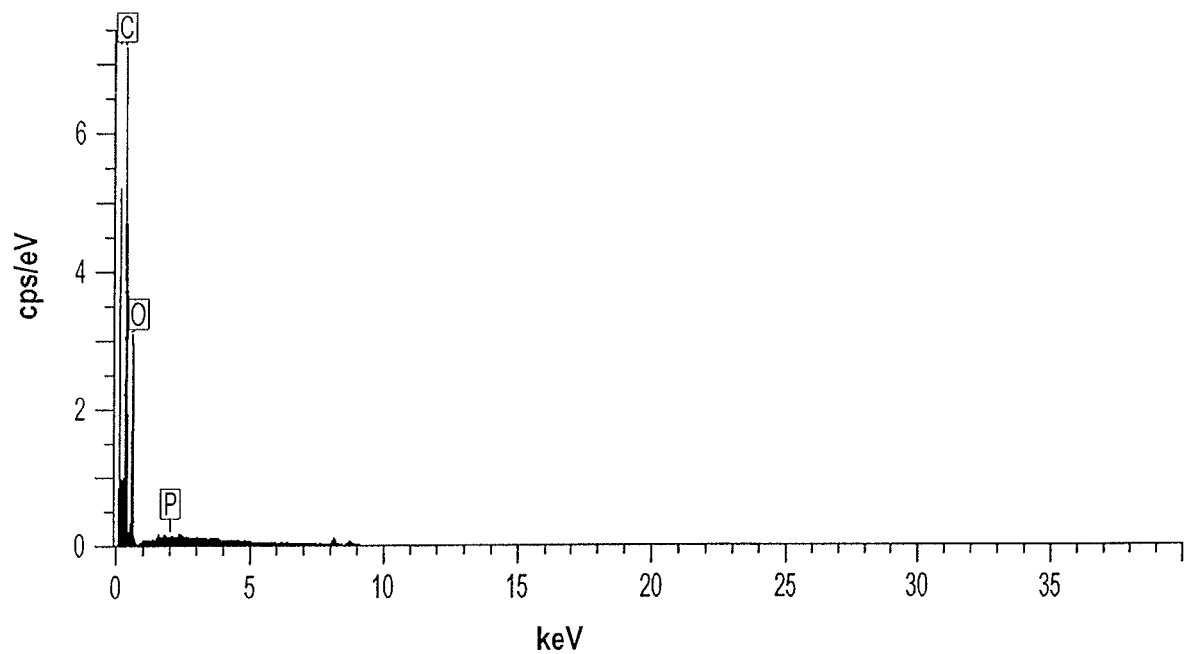
FIGS. 5A-5B shows energy dispersive X-ray (EDX) spectroscopy spectra of pristine (FIG. 5A) and MB saturated JFHC@150/3_PA (FIG. 5B).
Figure 5B:
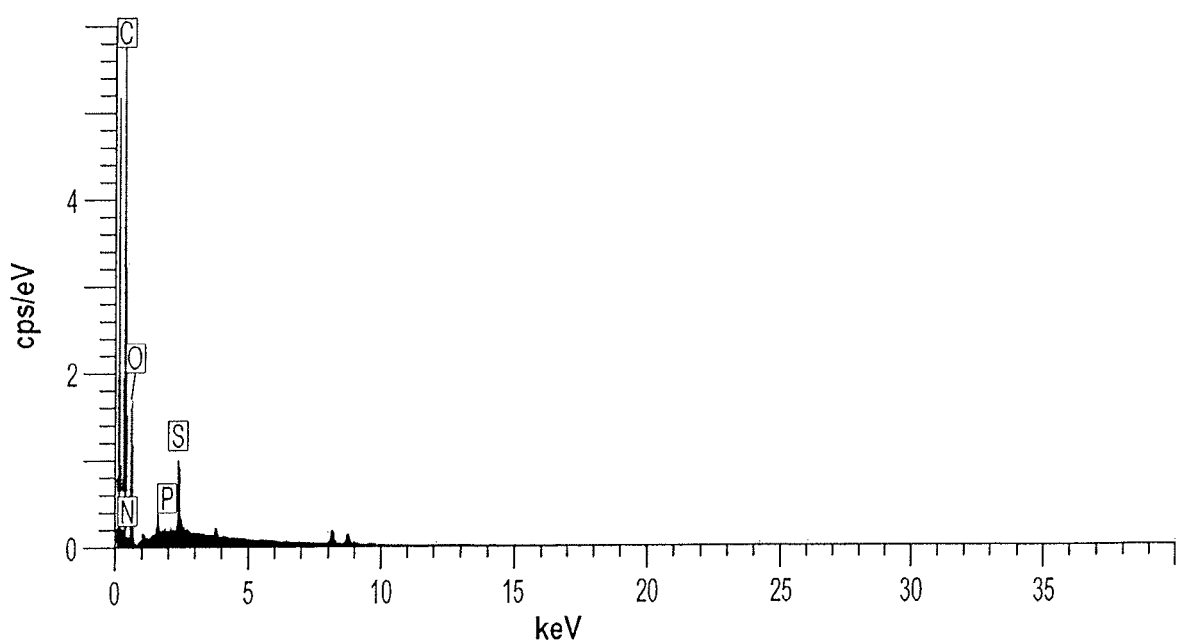

The morphology and elemental content of pristine and MB saturated JFHC@150/3_PA were determined by scanning electron microscopy (SEM: Nova 200 NanoLab, FEI, USA) coupled with energy-dispersive X-ray (EDX: AMETEK Nova 200) spectroscopic analysis. FIG. 4A shows an uneven and irregular pristine JFHC@150/3_PA surface, with evident pores. After MB adsorption, the JFHC@150/3_PA surface appears smoother with less apparent pores (FIG. 4B), presumably due to the formation of an MB film over the surface. The elemental analysis spectrum and elemental mapping image of JFHC@150/3_PA (FIG. 5A) shows traces of phosphorus, confirming successful chemical modification of JFHC@150/3 surface with PA. After MB adsorption on JFHC@150/3_PA, traces of nitrogen and sulfur were present in the elemental analysis spectrum, confirming attachment of MB to the JFHC@150/3_PA surface (FIG. 5B).

Figure 6:
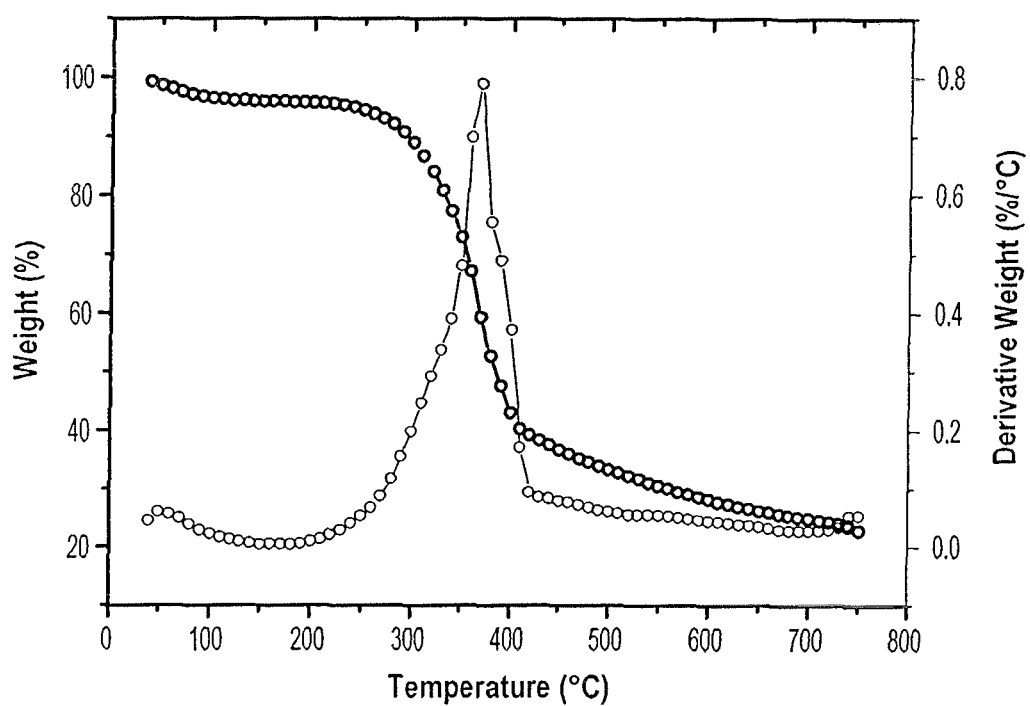
FIG. 6 is a plot showing thermogravimetric (TGA-DTA) analysis of JFTIC@150/3_PA.

Thermogravimetric analysis of JFHC@150/3_PA was performed (TGA-DTA: Q500 TGA, USA) at temperatures ranging from 30° C.-750° C. under $N_2$ atmosphere. FIG. 6 shows 4% weight loss as temperature increases from 30° C.-100° C., presumably due to evaporation of physically adsorbed water molecules from the JFHC@150/3_PA. A drastic 60% weight loss of JFHC@150/3_PA occurred between 250° C. and 400° C., presumably due to the decomposition of cellulose, hemicellulose and lignin typical of plant biomass. Furthermore, 14% weight loss occurred between temperatures ranging from 400° C. to 750° C., presumably due to degradation of lignin.

Figure 7:
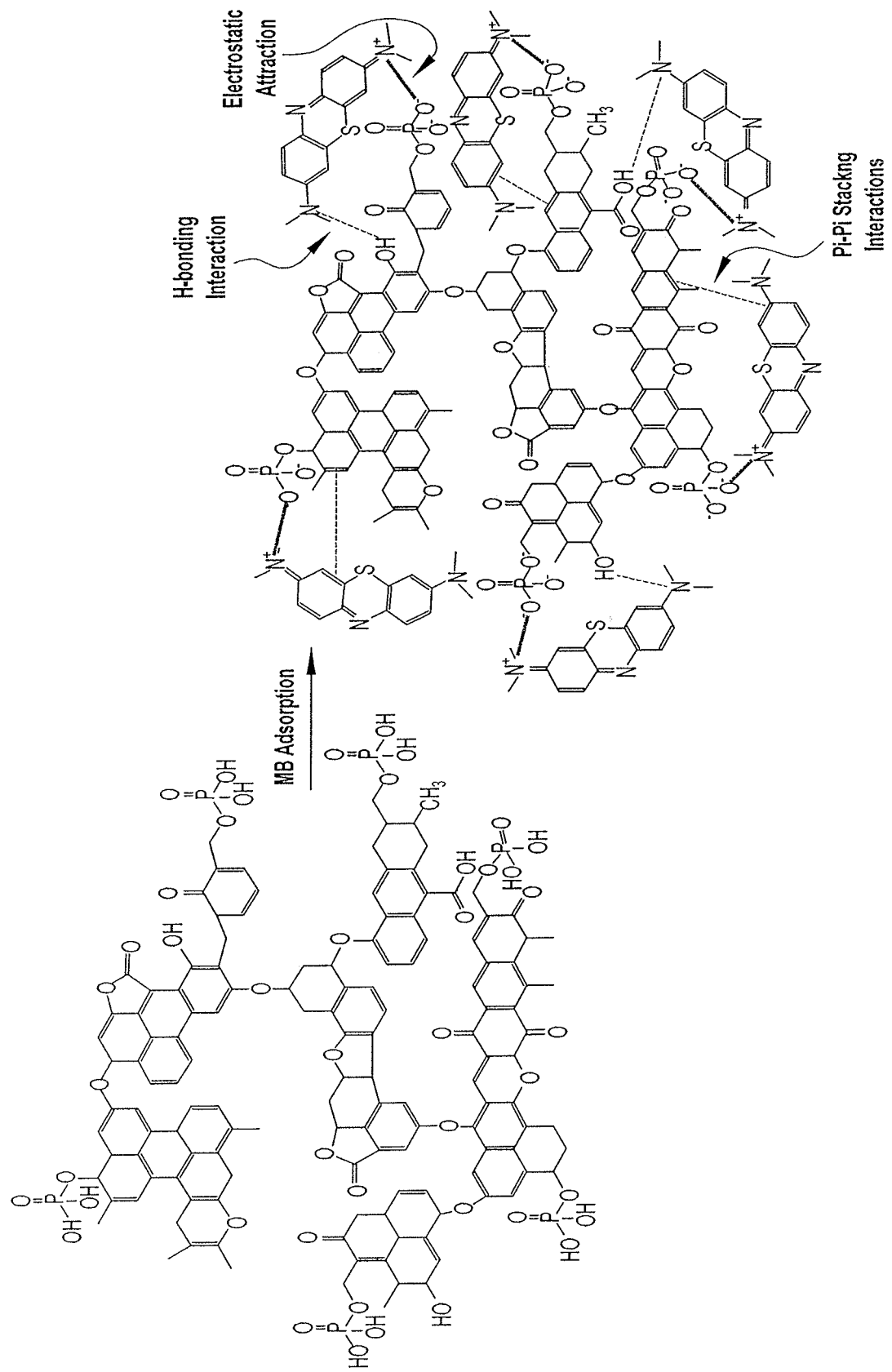
FIG. 7 is a diagrammatic representation of methylene blue (MB) adsorption on JFHC@150/3_PA.

FIG. 7 diagrammatically shows possible mechanisms for adsorption of MB on JFHC@150/3_PA, including formation of hydrogen bonds between —OH groups present on JFHC@150/3_PA and dimethylamino (—N(CH$_3$)$_2$) groups of MB dye, electrostatic interactions between the electron rich oxygen atoms on JFHC@150/3_PA and MB cations, and π-π stacking interactions between the aromatic rings of JFHC@150/3_PA and MB dye.

Example 4

Adsorption Experiments and Results

Preliminary studies were carried out to evaluate performance among the pristine and chemically activated JFHC samples for maximum MB removal efficiency. Batch scale adsorption experiments were carried out in 100 mL Erlenmeyer flasks, containing 25 mL MB solution of initial concentration ($C_o$). 20 mg/L was equilibrated with 0.01 g each pristine or chemically activated JFHC sample, under shaking conditions at 80 rpm for 24 h. Once equilibrium was reached, solid (JFHC sample) and solution (MB solution) phases were separated through filtration and the residual MB concentration was analyzed by UV-visible spectrometry (Thermo Scientific Evolution 600, UK) at a maximum wavelength ($\lambda_{max}$) of 665 nm. The adsorption of MB on JFHC was calculated as:

$$\text{Adsorption}(\%) = \frac{C_o - C_e}{C_o} \times 100 \tag{1}$$

The observed MB adsorptions (in %) for each JFHC sample is provided in Table 1 (under Example 2). The effect of variables viz., pH, contact time (t), temperature (T), dose (in), initial concentration ($C_o$) on MB adsorption onto JFHC@150/3_PA (sample with maximum (99.5%) MB removal) were further studied and MB adsorption capacities at equilibrium and at any time t were calculated as:

$$\text{Adsorption capacity at equilibrium}(q_e, \text{mg/g}) = (C_o - C_e) \times \frac{V}{m} \tag{2}$$

$$\text{Adsorption capacity at time } t \ (q_t, \text{mg/g}) = (C_o - C_t) \times \frac{V}{m} \tag{3}$$

Figure 8:
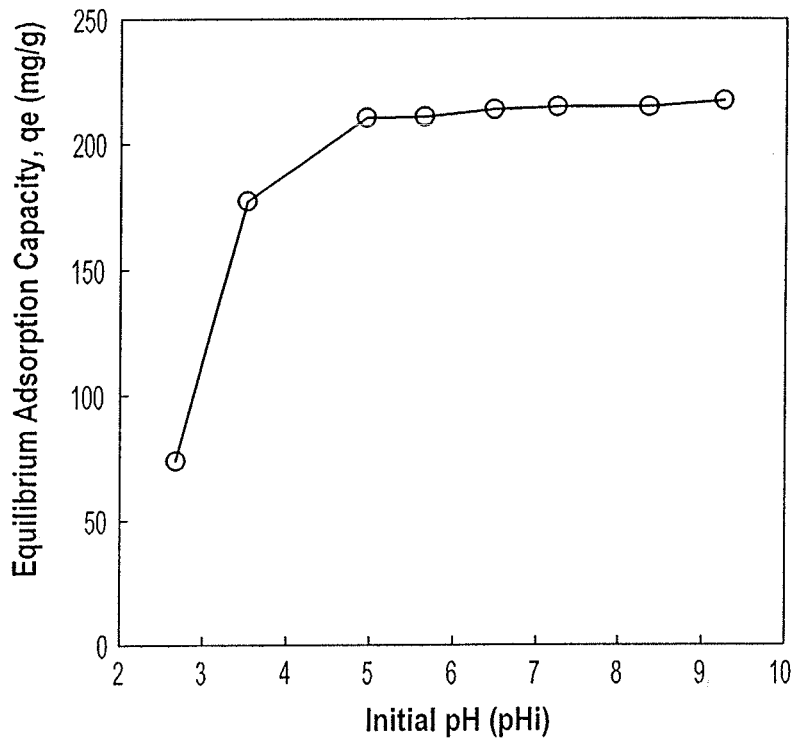
FIG. 8 is a plot showing the effect of initial pH ($pH_i$) on MB adsorption onto JFHC@150/3_PA.

The adsorption of MB at $C_0$: 50 mg/L on JFHC@150/3_PA as a function of pH$_i$ is illustrated in FIG. 8. The MB adsorption capacity was 74 mg/g at pH$_i$: 2.7, sharply increased to 210.4 mg/g at pH$_i$: 5, then slowly increased, reaching a measured maximum of 214.7 mg/g at pH$_i$: 7.2.

Figure 9:
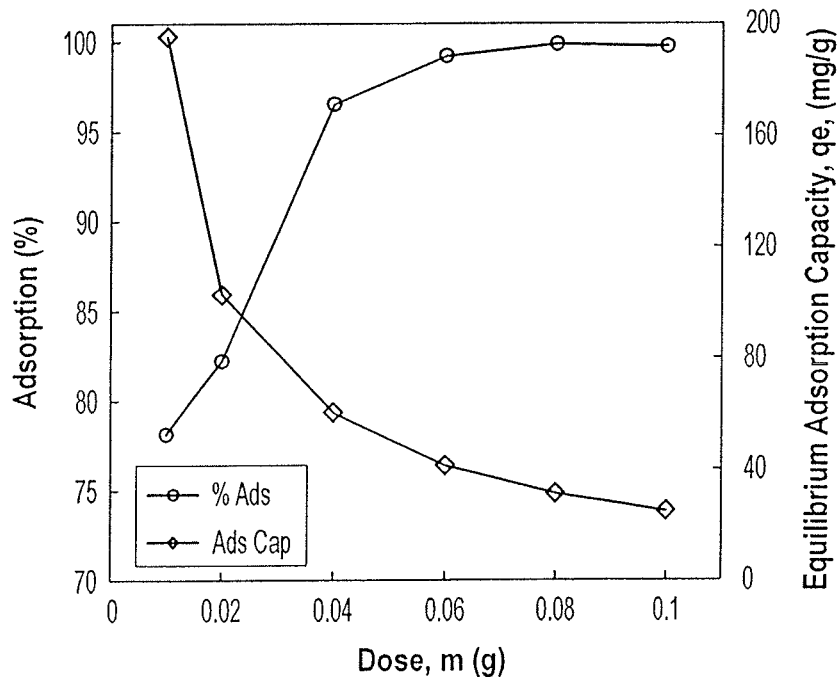
FIG. 9 is a plot showing the effect of JFHC@150/3_PA dose on MB adsorption.

The adsorption of MB at $C_o$: 50 mg/L was studied by varying JFHC@150/3_PA dose, as illustrated in FIG. 9. For doses in the range of 0.01 g-0.1 g, the MB adsorption capacity decreased from 195.3 mg/g to 24.9 mg/g, while the percentage (%) adsorption increased from 78% to 99.7%.

Figure 10:
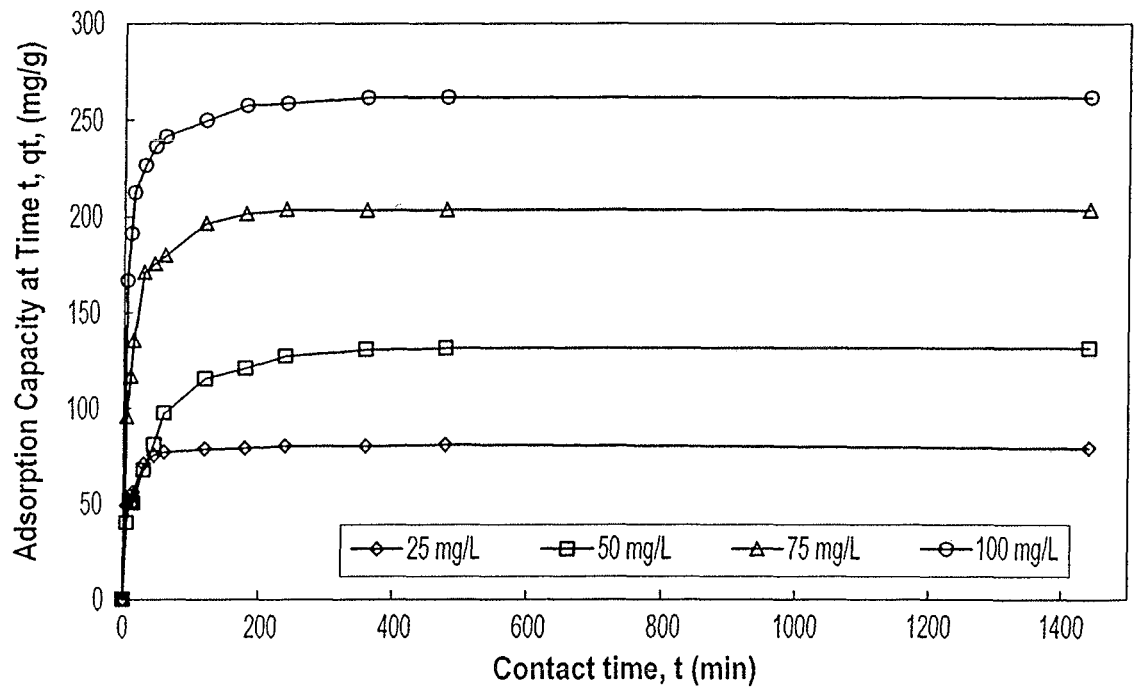
FIG. 10 is a plot illustrating the effect of contact time on MB adsorption at varied concentrations onto JFHC@150/3_PA.

The adsorption of MB on JFHC@150/3_PA as a function of contact time was studied at varied MB $C_o$ ranging from 25 mg/L-100 mg/L, as illustrated in FIG. 10. For an initial 30 minutes of contact time, a sharp increase in MB adsorption was observed. Thereafter, the adsorption process approached an equilibrium. The equilibration time for the studied $C_o$ values varied from 360 min (6 h) to 480 min (8 h).

Figure 11:
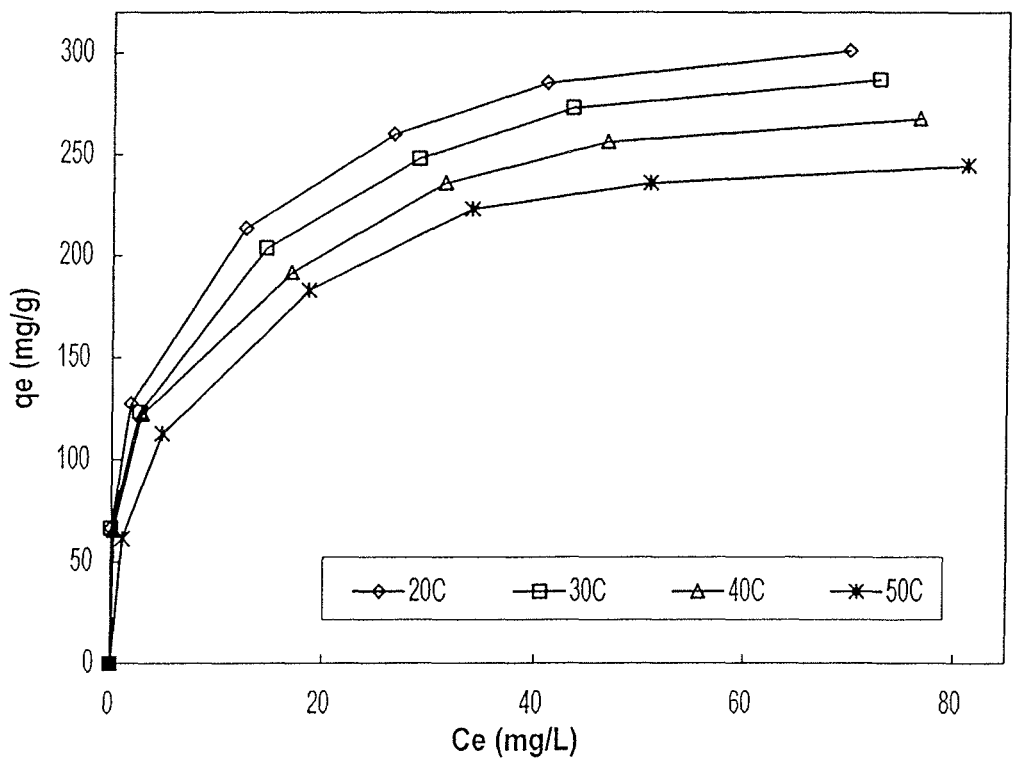
FIG. 11 is a plot illustrating equilibrium adsorption capacity versus equilibrium concentration at varied temperatures.

FIG. 11 shows equilibrium concentration ($C_e$) versus adsorption capacity at equilibrium ($q_e$) for MB adsorption on JFHC@150/3_PA at varied temperatures. The MB adsorption on JFHC@150/3_PA decreased with increase in temperature, consistent with exothermic MB adsorption.

Example 5

Desorption Experiments and Results

The regeneration potential of JFHC@150/3_PA was tested through batch scale desorption experiments. The MB saturated JFHC@150/3_PA samples described in Example 4 were washed several times with D.I. water to completely remove unadsorbed MB. Thereafter, the saturated JFHC@150/3_PA samples were treated with one of several eluents chosen from a group of solvents and 0.1 M base or acid solutions. The amount of MB desorbed was calculated as:

$$\text{Desorption}(\%) = \frac{\text{Concentration of } MB \text{ desorbed by eluent}}{\text{Initial concentration of } MB \text{ adsorbed on } JFHC@150/3\_PA} \times 100 \quad (4)$$

Figure 12A:
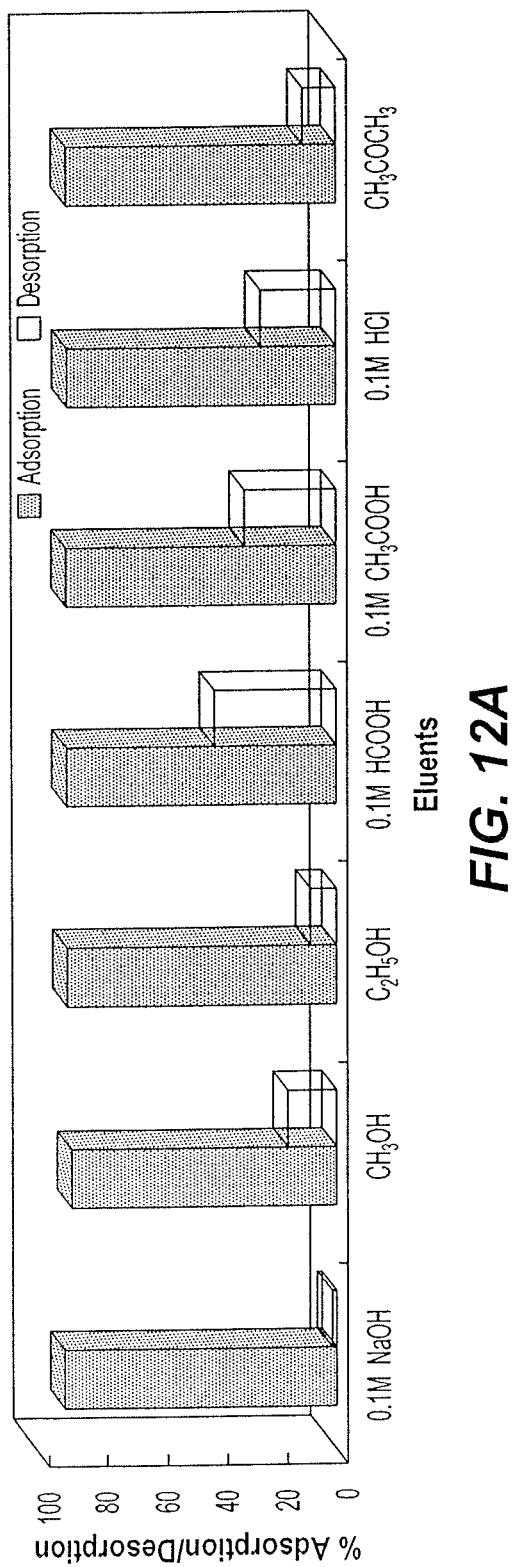
FIG. 12A is a plot presenting adsorption/desorption of MB from JFHC@150/3_PA by various eluents.
Figure 12B:
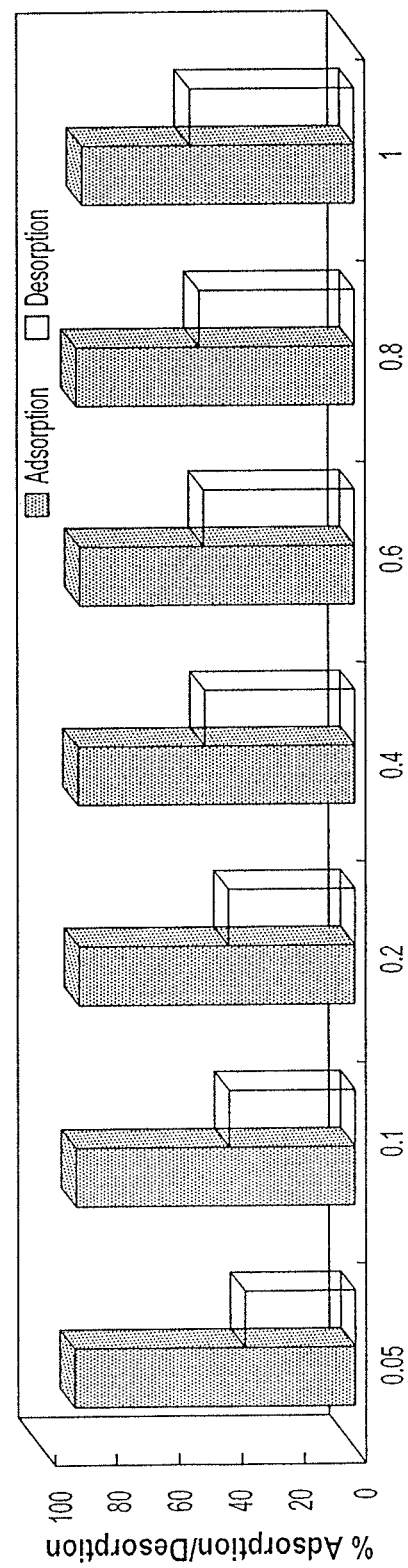
FIG. 12B is a plot presenting the adsorption/desorption of MB from JFHC@150/3_PA by HCOOH at varied concentrations.

FIG. 12A shows maximum (40.4%) MB desorption was observed following treatment with 0.1 M HCOOH. Among the other eluents tested, MB desorption percentage followed the trend: 0.1M $CH_3COOH$>0.1M HCl>$CH_3OH$>$CH_3COCH_3$>$C_2H_5OH$>0.1M NaOH. The effect of HCOOH concentration on MB recovery from the saturated JFHC@150/3_PA samples is illustrated in FIG. 12B. The MB desorption increased with increasing HCOOH concentration from 0.05 M to 1.0 M, achieving a maximum desorption of 52.6%.

It is to be understood that the method of synthesizing hydrochar from jackfruit is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of synthesizing hydrochar from jackfruit, comprising the steps of:
    adding a jackfruit peel biomass to a liquid carrier;
    subjecting the jackfruit peel biomass in the liquid carrier to hydrothermal carbonization to provide a hydrochar, the hydrothermal carbonization comprising heating the jackfruit peel biomass in the liquid carrier to a temperature ranging from 150° C. to 250° C. for 3 hours; and
    separating the hydrochar from the liquid carrier.

2. The method of claim 1, further comprising a step of chemically activating the hydrochar.

3. The method of claim 2, wherein the step of chemically activating the hydrochar comprises providing the hydrochar in a solution comprising at least one of phosphoric acid ($H_3PO_4$) and hydrogen peroxide ($H_2O_2$).

4. The method of claim 1, wherein the jackfruit peel biomass is prepared by
    drying jackfruit peel to provide a dried jackfruit peel; and
    pulverizing the dried jackfruit peel to substantially uniform consistency.

5. The method of claim 1, wherein liquid carrier is water.

6. A method of synthesizing activated hydrochar from jackfruit, comprising the steps of:
    drying jackfruit peel and pulverizing the dried jackfruit peel to provide a jackfruit peel biomass;
    adding the jackfruit peel biomass to water to form a slurry;
    heating the slurry to a temperature ranging from about 150° C.–250° C. for about 3 hours in an autoclave to provide a hydrochar;
    separating an initial hydrochar from the liquid carrier;
    drying the initial hydrochar; and
    adding the dried hydrochar to a solution comprising at least one of phosphoric acid ($H_3PO_4$) and hydrogen peroxide ($H_2O_2$) to form an activated hydrochar.

* * * * *